(12) United States Patent
Englebright et al.

(10) Patent No.: US 10,711,830 B2
(45) Date of Patent: Jul. 14, 2020

(54) SOCKET ASSEMBLY

(71) Applicant: Federal-Mogul Motorparts Corporation, Southfield, MI (US)

(72) Inventors: Seth Wayne Englebright, Festus, MO (US); Donald Richard Doherty, St. Peters, MO (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 488 days.

(21) Appl. No.: 15/446,105

(22) Filed: Mar. 1, 2017

(65) Prior Publication Data

US 2018/0252259 A1 Sep. 6, 2018

(51) Int. Cl.
*F16C 11/00* (2006.01)
*F16C 11/08* (2006.01)
*F16C 11/06* (2006.01)

(52) U.S. Cl.
CPC .......... *F16C 11/08* (2013.01); *F16C 11/0685* (2013.01); *F16C 11/086* (2013.01); *F16C 2202/08* (2013.01); *F16C 2208/66* (2013.01); *Y10T 403/32721* (2015.01); *Y10T 403/32754* (2015.01); *Y10T 403/32762* (2015.01)

(58) Field of Classification Search
CPC ..... F16C 11/0685; F16C 11/08; F16C 11/086; F16C 2202/08; F16C 2208/66; Y10T 403/32721; Y10T 403/32754; Y10T 403/32762
See application file for complete search history.

(56) References Cited

U.S. PATENT DOCUMENTS

| | | | |
|---|---|---|---|
| 2,560,024 A | | 7/1951 | Brown |
| 4,003,666 A | * | 1/1977 | Gaines .................. F16C 11/068 403/36 |
| 4,231,673 A | * | 11/1980 | Satoh .................. F16C 11/0633 403/125 |
| 4,259,027 A | * | 3/1981 | Hata .................... F16C 11/0642 403/132 |
| 4,290,181 A | | 9/1981 | Jackson |

(Continued)

FOREIGN PATENT DOCUMENTS

| | | |
|---|---|---|
| DE | 29721050 U1 | 3/1999 |
| DE | 102007044668 A1 | 4/2009 |

OTHER PUBLICATIONS

International Search Report, dated May 22, 2018 (PCT/US2018/020068).

*Primary Examiner* — Matthew R McMahon
(74) *Attorney, Agent, or Firm* — Robert L. Stearns; Dickinson Wright, PLLC

(57) ABSTRACT

The socket assembly includes a housing that presents an inner wall which surrounds an open bore. A stud is partially received in the open bore with a bearing interposed between the inner wall and the stud. The bearing has a bearing piece, which is in surface-to-surface contact with the stud, and a preload piece which is elastically compressed to impart a biasing force on the bearing piece, thereby preloading the bearing piece against the stud. The preload piece is in an overmolded engagement with the bearing piece to securely couple these pieces together such that the bearing can be inserted into the open bore of the housing together as a unit. The bearing and preload pieces are made of different materials with different elasticities.

6 Claims, 4 Drawing Sheets

(56) References Cited

U.S. PATENT DOCUMENTS

| | | | |
|---|---|---|---|
| 4,684,279 A | 8/1987 | Weber | |
| 4,695,182 A | 9/1987 | Wood, Jr. | |
| 4,714,368 A * | 12/1987 | Sawada | F16C 11/0614 403/132 |
| 4,750,885 A * | 6/1988 | Ito | F16C 11/0638 403/133 |
| 4,875,794 A * | 10/1989 | Kern, Jr. | F16C 11/086 403/132 |
| 4,995,754 A * | 2/1991 | Ishii | F16C 11/086 403/132 |
| 4,995,755 A * | 2/1991 | Hyodo | B62D 7/163 29/510 |
| 5,009,538 A * | 4/1991 | Shirai | F16C 7/026 403/122 |
| 5,188,477 A * | 2/1993 | Idosako | B60G 7/005 403/132 |
| 5,609,433 A * | 3/1997 | Pazdirek | F16C 11/0657 264/273 |
| 5,697,723 A * | 12/1997 | Wood | F16C 11/0638 403/135 |
| 5,997,208 A * | 12/1999 | Urbach | F16C 11/0633 403/133 |
| 6,688,799 B2 * | 2/2004 | Broker | F16C 11/0628 403/133 |
| 6,821,047 B2 * | 11/2004 | Broker | F16C 11/0638 403/132 |
| 7,641,413 B2 * | 1/2010 | Shimazu | F16C 11/069 403/135 |
| 8,151,464 B2 | 4/2012 | Orend | |
| 10,001,163 B1 * | 6/2018 | Elterman | F16C 11/0604 |
| 10,145,410 B2 * | 12/2018 | Parker | F16C 11/06 |
| 2015/0217614 A1 | 8/2015 | Aoki | |
| 2016/0160907 A1 | 6/2016 | Kim | |

* cited by examiner

SOCKET ASSEMBLY

BACKGROUND OF THE INVENTION

1. Field of the Invention

The present invention relates generally to socket assemblies and more particularly to bearings for socket assemblies of vehicle steering and/or suspension systems.

2. Related Art

Vehicle steering and suspension assemblies typically include multiple ball joint assemblies for interconnecting the various components with one another. Each such ball joint assembly has a housing with an open bore and a stud which is partially disposed in the open bore and extends outwardly therefrom. One or more bearings are interposed in the open bore between the housing and stud. The housing and stud are fixed with different steering or suspension components. During operation, the bearing or bearings allow the housing and stud, and the components fixed with the housing and stud, to freely rotate and articulate relative to one another.

Some ball joint assemblies include a washer spring or some other biasing element, which is a separate component from the bearings, that imparts a biasing force on one of the bearings to preload the bearing against the stud, thereby maintaining surface-to-surface contact between the bearing (or bearings) and the stud throughout their operating lives.

SUMMARY OF THE INVENTION AND ADVANTAGES

One aspect of the present invention is related to an improved socket assembly which includes a housing that presents an inner wall which surrounds an open bore which extends along a central axis. A stud is partially received in the open bore and projects outwardly therefrom through an open end of the housing. A bearing is disposed in the inner bore of the housing and is interposed between the inner wall and the stud. The bearing has a bearing piece, which is in surface-to-surface contact with the stud, and a preload piece which is elastically compressed to impart a biasing force on the bearing piece, thereby preloading the bearing piece against the stud. The preload piece is in an overmolded engagement with the bearing piece to securely couple these pieces together such that the bearing can be inserted into the open bore of the housing together as a unit. The bearing piece is made of a first material with a first modulus of elasticity, and the preload piece is made of a second material that has a second modulus of elasticity which is lower than the first modulus of elasticity.

This aspect of the present invention is advantageous in that it reduces the number of parts that have to be inserted into the housing during assembly, thereby reducing manufacturing time and inventory costs. Additionally, reducing the number of parts reduces the complexity of the assembly process and makes it easier to ensure the proper inventory of mating parts is on hand. Moreover, since fewer parts have to be installed in the housing and aligned with one another, the present invention makes it more difficult for one part to be accidentally omitted or installed in the housing improperly.

Further, the present invention reduces difficulties that are typically experienced with dimensional tolerances and stack ups between parts. For example, any dimensional intolerances in whichever of the bearing and preload pieces can be compensated for during the overmolding operation. Still further, a variation in material behavior and geometry can be obtained by molding one part into another. This is not possible when the bearing and preload pieces of the bearing are separate components that have to be inserted into the open bore of the housing separately.

According to another aspect of the present invention, the bearing piece includes a plurality of protrusions which are spaced from one another to improve the overmolding engagement between the bearing and preload pieces.

According to yet another aspect of the present invention, the housing is deformed to compress the preload piece of the bearing.

According to still another aspect of the present invention, the preload piece is compressed between the bearing piece and a wall at a closed end of the housing.

According to a further aspect of the present invention, the stud is a ball stud with a ball portion that is semi-spherically curved, and the bearing piece has a bearing surface which is semi-spherically curved and is in surface-to-surface contact with the semi-spherically curved outer surface of the ball portion.

According to yet a further aspect of the present invention, the first and second materials have similar melting point temperatures, such that the overmolding connection includes a fusion of the materials of the bearing and preload pieces.

According to still a further aspect of the present invention, the first material is a glass-reinforced polyoxymethylene, and the second material is an unreinforced polyoxymethylene.

Another aspect of the present invention is related to a method of making a socket assembly. The method includes the step of injection molding a first piece of a bearing out of a first material. The method continues with the step of inserting the first piece of the bearing into a die cavity. The method proceeds with the step of injecting a liquid of a second material that is different than the first material into the die cavity such that the liquid of the second material contacts the first piece of the bearing. The method continues with the step of allowing the liquid to solidify into a second piece of the bearing wherein the first and second pieces are in an overmolding connection with one another. The method proceeds with the step of inserting the bearing into an open bore of a housing. The method continues with the step of inserting a stud into the open bore of the housing. The method proceeds with the step of compressing one of the first and second pieces of the bearing to preload the other of the first and second pieces of the bearing against the stud.

According to another aspect of the present invention, the first and second materials have similar melting point temperatures such that injecting the second material into the die cavity results in at least partially melting the first material of the first piece to fuse the first and second pieces together.

According to yet another aspect of the present invention, the first piece is a bearing piece and the second piece is a preload piece.

According to still another aspect of the present invention, one of the first and second pieces presents a plurality of protrusions for improving the overmolding connection between the first and second pieces.

According to a further aspect of the present invention, the first material is a glass-reinforced polyoxymethylene, and the second material is an unreinforced polyoxymethylene.

According to yet a further aspect of the present invention, the method further includes the step of inserting a portion of the stud into a cavity of the bearing, and the steps of inserting the bearing and the stud into the open bore of the housing occur together.

According to still a further aspect of the present invention, the bearing includes a plurality of fingers which are spaced circumferentially from one another and which are resiliently deflectable to receive the portion of the stud into the cavity.

BRIEF DESCRIPTION OF THE DRAWINGS

These and other aspect, features and advantages of the invention will become more readily appreciated when considered in connection with the following detailed description of the presently preferred embodiment and best mode, appended claims and accompanying drawings, in which:

DETAILED DESCRIPTION OF THE ENABLING EMBODIMENT

Figure 2:
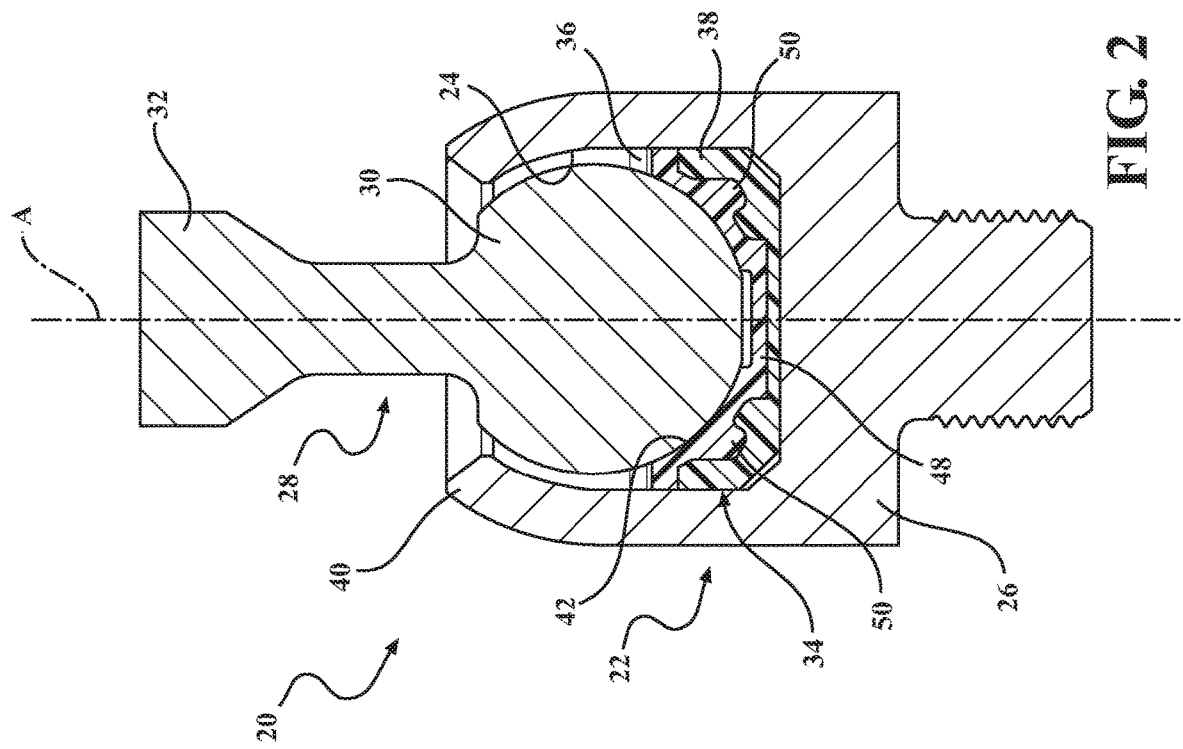
FIG. 2 is a cross-sectional view of the socket assembly of FIG. 1, taken through Line 2-2 of FIG. 1.
Figure 1:
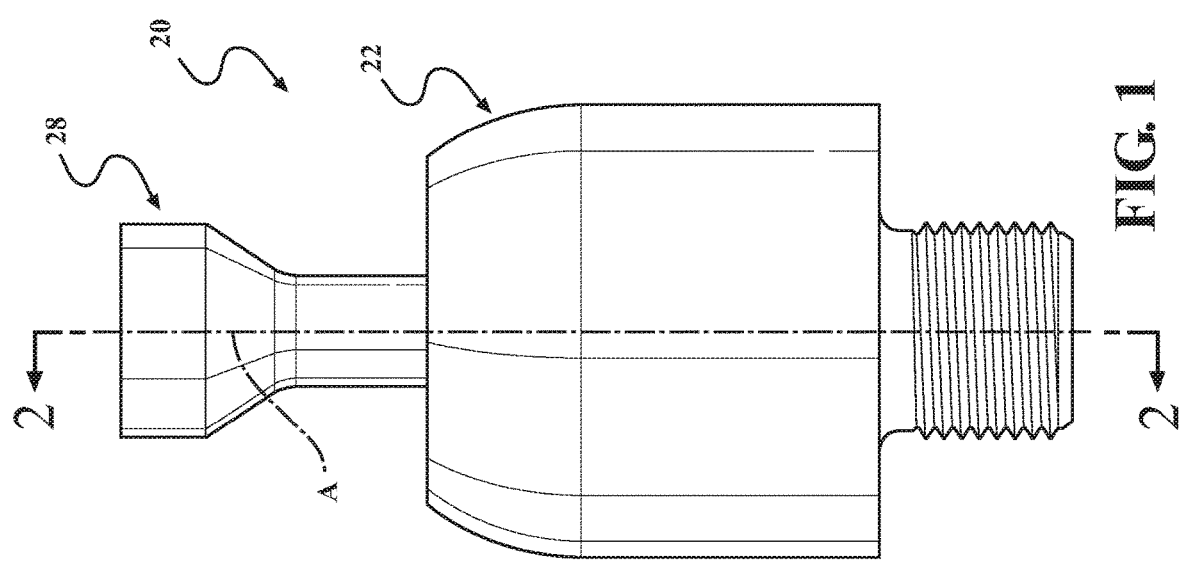
FIG. 1 is a front elevation view of a first exemplary embodiment of a socket assembly constructed in accordance with one aspect of the present invention.
Figure 3:
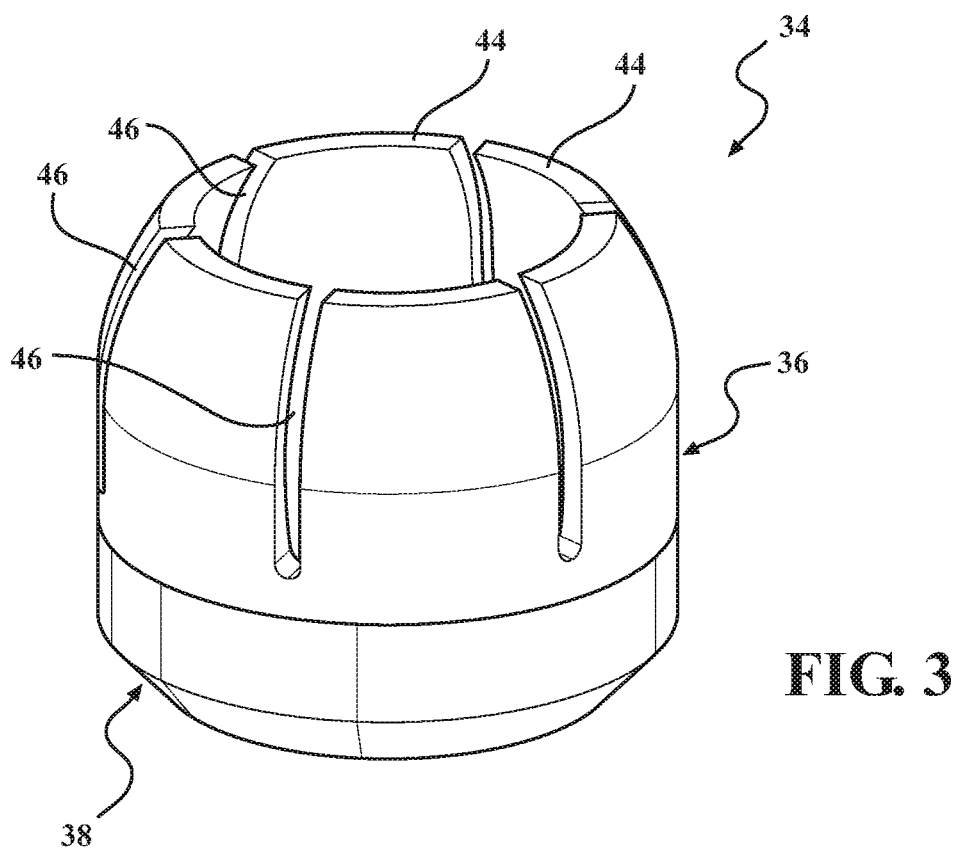
FIG. 3 is a perspective view of a bearing of the socket assembly of FIG. 1.

Referring to the Figures, wherein like numerals indicate corresponding parts throughout the several views, a socket assembly 20 for use in vehicle steering or suspension systems is generally shown in FIGS. 1 and 2. In the exemplary embodiment, the socket assembly 20 is specifically adapted for attaching an inner tie rod end to another steering component, such as a center link. However, it should be appreciated that the socket assembly 20 could find other uses in vehicle steering and/or suspension systems, e.g., to interconnect a control arm or an outer tie rod end with a steering knuckle. The socket assembly 20 could also find uses in a range of other automotive or non-automotive applications.

The socket assembly 20 includes a housing 22 with an inner wall 24 which surrounds a cup-shaped inner bore that extends along a central axis A from a lower wall 26 at a closed end to an open end. The housing 22 may be made of any suitable material (for example, iron, steel, alloy steel, aluminum or an aluminum alloy) and may be shaped through any suitable process or combination of processes (for example, casting, forging or machining).

The socket assembly 20 also includes a ball stud 28 which is partially received in the open bore of the housing 22 and projects outwardly therefrom through the open end. Specifically, the ball stud 28 includes a ball portion 30 that is disposed in the open bore and a shank portion 32, which is a tie rod in the exemplary embodiment, that projects out of the housing 22. The ball portion 30 has an outer surface which is semi-spherically curved. The ball stud 28 is preferably made of metal, such as steel or a steel alloy, and may be shaped through any suitable process or combination of processes.

A bearing 34 is disposed in the inner bore of the housing 22 and is interposed between the ball portion 30 of the ball stud 28 and the inner wall 24 of the housing 22 to provide a low friction interface which allows the ball stud 28 and housing 22 to rotate and articulate relative to one another during operation of the steering system. In the exemplary embodiment, the bearing 34 is made of two pieces (hereinafter referred to as a bearing piece 36 and a preload piece 38) that are secured together as a unit which can be inserted into the inner bore of the housing 22 during manufacture of the socket assembly 20. After the bearing 34 and ball portion 30 of the ball stud 28 are inserted into the inner bore of the housing 22, the open end of the housing 22 is deformed (for example, through swaging) to present a radially inwardly extending lip 40 which contacts the bearing 34 to maintain the bearing 34 and the ball portion 30 of the ball stud 28 in the open bore of the housing 22.

Figure 4:
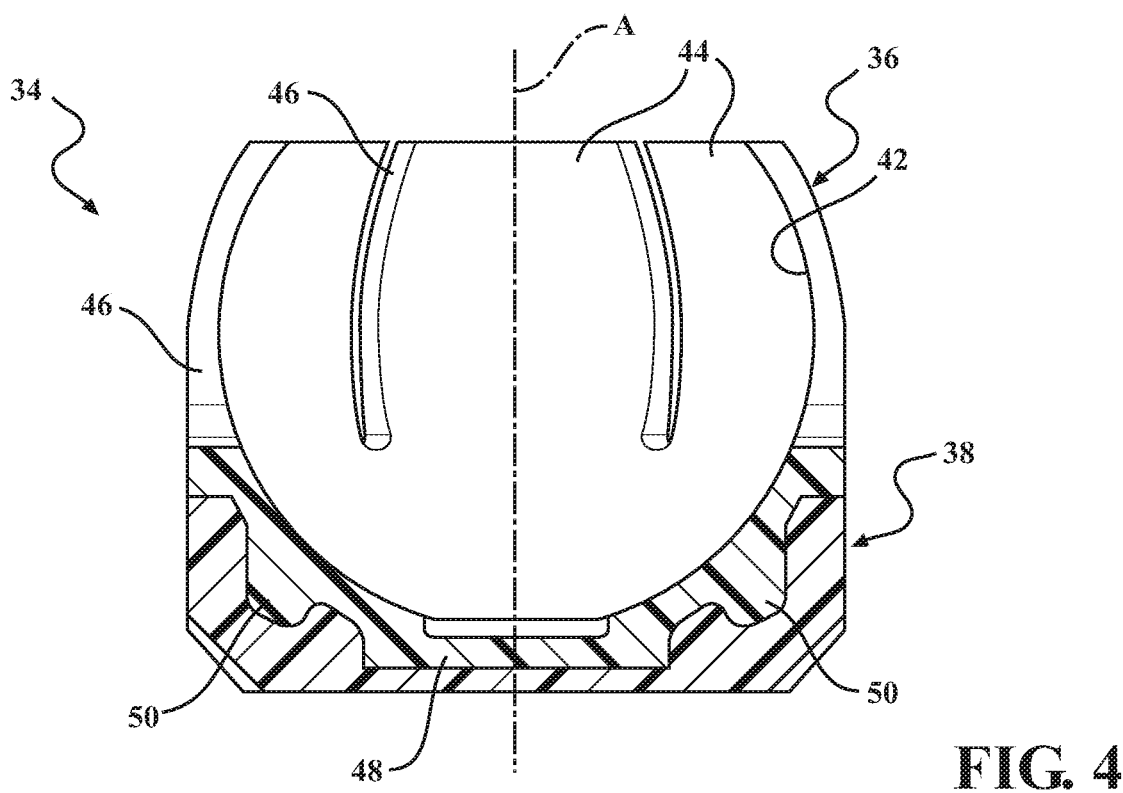
FIG. 4 is a cross-sectional view of the bearing of FIG. 3.

As shown in FIG. 4, the bearing piece 36 extends along the central axis A and presents a curved bearing surface 42 which surrounds a semi-spherically shaped cavity. Referring back to FIG. 2, the radius of curvature of the bearing surface 42 matches the radius of curvature of the outer surface of the ball portion 30 of the ball stud 28 such that when the ball portion 30 is received in the semi-spherically shaped cavity, the bearing surface 42 is in surface-to-surface contact with the outer surface of the ball portion 30. The bearing piece 36 is preferably made of a low friction polymeric material, and the open bore of the housing 22 is preferably filled with a lubricant (such as grease) to allow the ball stud 28 and housing 22 to freely rotate and articulate relative to one another during operation of the steering system. The bearing piece 36 presents a plurality of fingers 44 which are spaced from one another in a circumferential direction by a plurality of slots 46. The fingers 44 are resiliently deflectable in a radially outward direction during assembly to allow the ball portion 30 of the ball stud 28 to be pressed into the semi-spherically shaped cavity, whereupon the fingers 44 snap into engagement with an upper hemisphere of the ball portion 30.

As shown in FIG. 4, the preload piece 38 is lockingly engaged with a bottom wall 48 of the bearing piece 36. The bearing and preload pieces 36, 38 have identical outer diameters which match an inner diameter of the inner wall 24 of the housing 22 such that the bearing 34 is restricted from shaking or rattling within the inner bore.

The preload piece 38 of the bearing 34 is overmolded into engagement with the bearing piece 36 to connect these pieces as a single unit. In the exemplary embodiment, the bottom wall 48 of the bearing piece 36 is provided with a plurality of protrusions 50 that project in the axial direction away from the spherically shaped cavity. The protrusions 50 are spaced apart from one another along the bottom wall 48 and serve to increase the surface-to-surface contact between the bearing piece 36 and the preload piece 38, thereby improving the overmolded connection between these components. The protrusions 50 may be provided with hooks, steps, openings or other engaging features to further improve the locking engagement between the bearing and preload pieces 36, 38.

The bearing and preload pieces 36, 38 are made of different materials, such that each may be made of a material which is optimized for its intended purpose. The bearing piece 36 is preferably made of a glass-reinforced polyoxymethylene (also known as POM or acetal) material which has a first modulus of elasticity. This material has been found to provide a very low friction interface between the bearing surface 42 and the outer surface of the ball portion 30. However, it should be appreciated that other materials, such as nylon polyesters could be employed. The preload piece 38 is preferably made of an unreinforced POM material, which has been found to provide optimum elasticity and shrinkage properties. However, it should be appreciated that other materials may be employed. The material of the preload piece 38 has a second modulus of elasticity which is less than the first modulus of elasticity of the bearing piece 36, i.e., the preload piece 38 has a greater elasticity than the bearing piece 36. Preferably, the materials of the bearing and preload pieces 36, 38 have similar melting temperatures and similar shrinkage rates to at least partially fuse the bearing and preload pieces 36, 38 together, thereby establishing a particularly strong overmolding connection between these pieces.

The swaging operation to deform the housing 22 slightly elastically compresses the preload piece 38 between the bearing piece 36 and the lower wall 26 of the housing 22 such that that the preload piece 38 imparts a biasing force on the bearing piece 36, thereby preloading the curved bearing surface 42 of the bearing piece 36 against the outer surface of the ball portion 30 of the ball stud 28. As the bearing piece 36 and the ball portion 30 of the ball stud 28 wear, the preload from the preload piece 38 maintains the surface-to-surface contact between these components to maintain optimum performance throughout the operating life of the socket assembly 20. This is accomplished without a washer spring or a coil spring, which are commonly found in other socket assemblies to preload the bearing against the ball stud.

Figure 5:
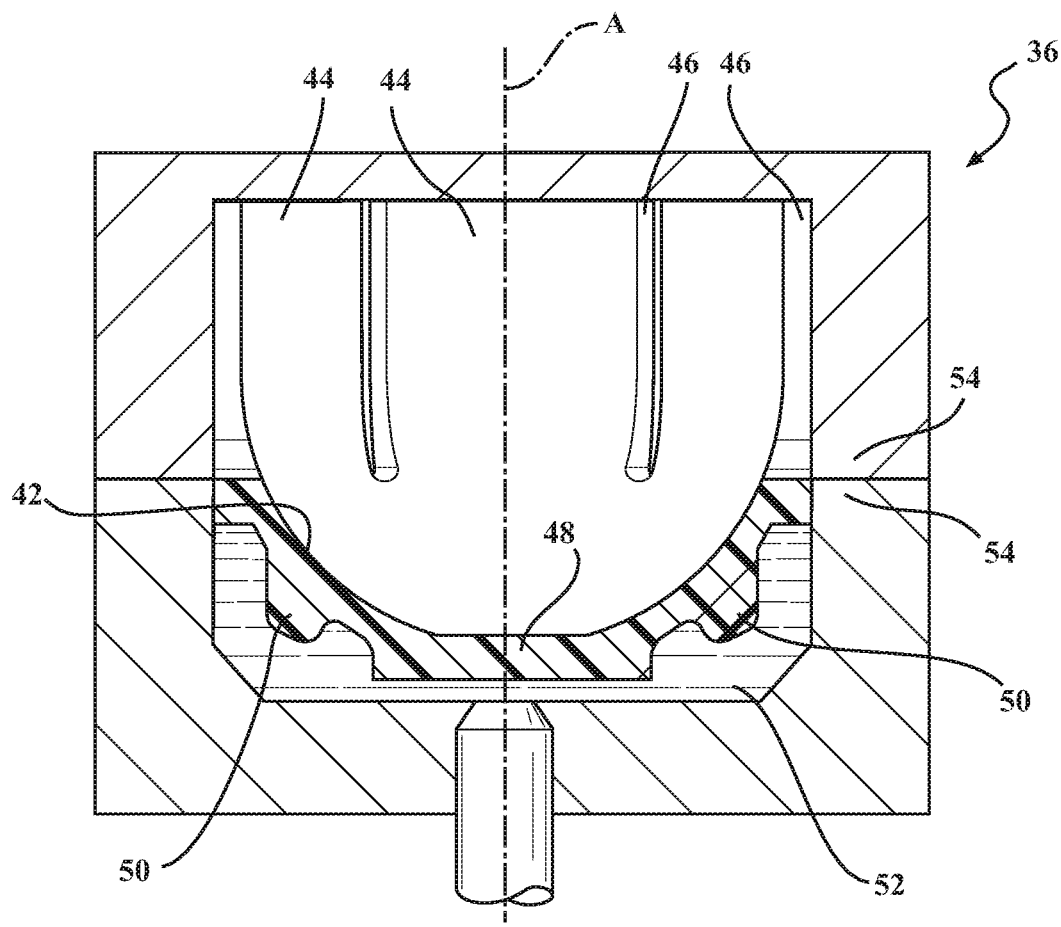
FIG. 5 is a cross-sectional view of an overmolding operation to manufacture the bearing of FIG. 3.

Another aspect of the present invention provides for a method of making a socket assembly 20, such as the socket assembly 20 of FIGS. 1 and 2. The method includes the step of injection molding a first piece of a bearing 34 out of a first material (such as glass-reinforced polyoxymethylene). In the exemplary embodiment, the first piece is a bearing piece 36. However, it should be appreciated that the first piece could alternately be a preload piece 38. The bearing piece 36 preferably includes a plurality of protrusions 50 which are spaced apart from one another and project into the die cavity 52. The method continues with the step of inserting the bearing piece 36 into a die cavity 52 (such as the die cavity 52 shown in FIG. 5) of a die assembly 54. The method proceeds with the step of injecting a liquid of a second material (such as unreinforced polyoxymethylene) that is different than the first material into the die cavity 52 such that the liquid of the second material contacts the bearing piece 36 or preload piece 38. The first and second materials preferably have similar melting point temperatures, and therefore, the liquid second material partially melts the first material of the bearing piece 36. The first and second materials then are then cooled and solidified to present a bearing 34 with a bearing piece 36 and a preload piece 38 which are at least partially fused together into a unit. The exemplary method proceeds with the step of inserting a semi-spherical ball portion 30 of a ball stud 28 into a semi-spherical cavity of the bearing piece 36 of the bearing 34. Next, the bearing 34 and the ball portion 30 of the ball stud 28 are inserted together into an open bore of a housing 22. The method continues with the step of swaging an open end of the housing 22 to present a lip 40 which captures the bearing 34 and ball portion 30 of the ball stud 28 in the open bore and compresses the preload piece 38 of the bearing between a lower wall 26 of the housing 22 and the bearing piece 36 to bias a bearing surface of the bearing piece 36 against an outer surface of the ball portion 30 of the ball stud 28.

Figure 6:
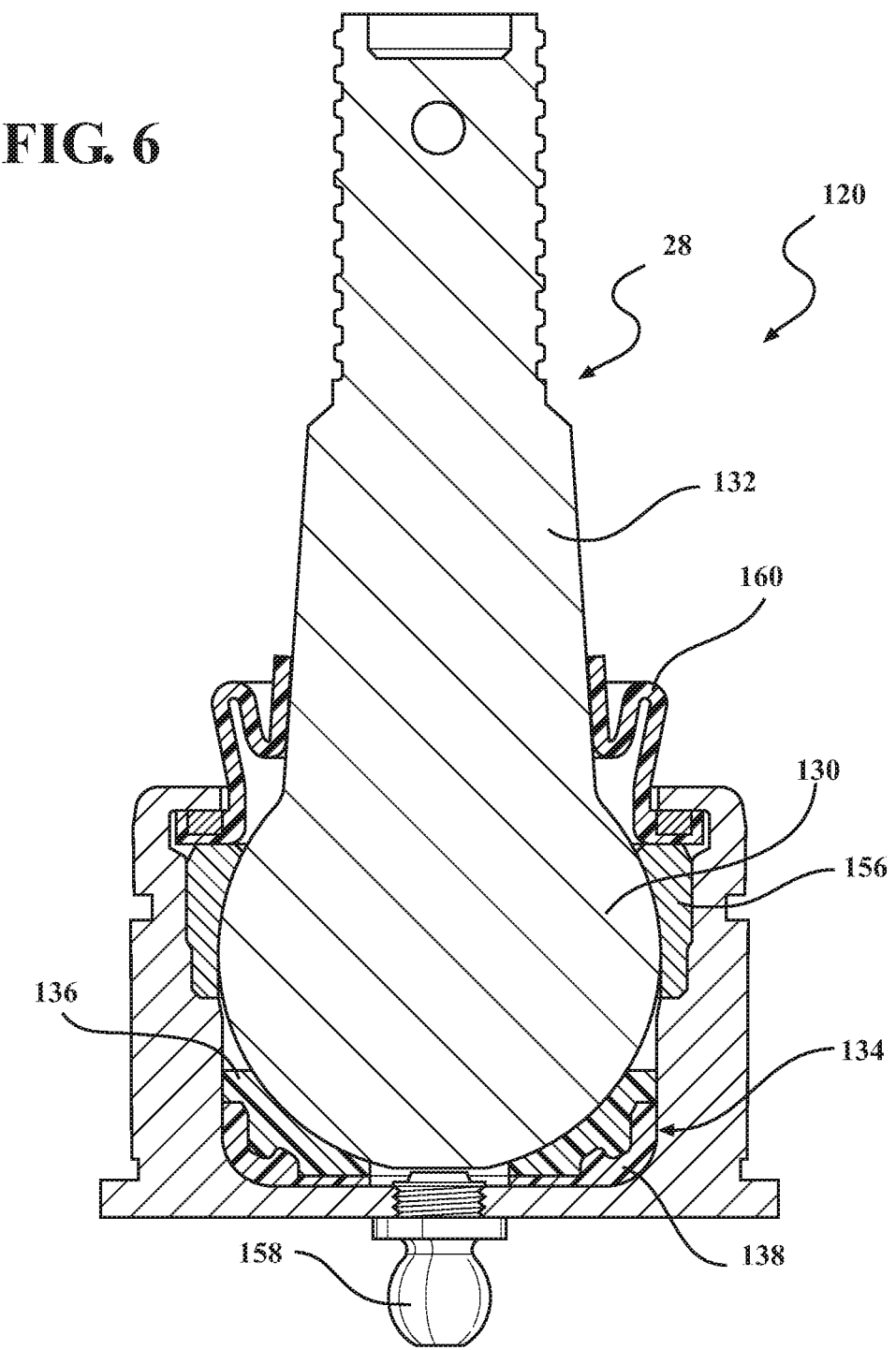
FIG. 6 is a cross-sectional view of an alternate embodiment of the socket assembly.

Referring now to FIG. 6, an alternate embodiment of the socket assembly 120 is generally shown with like numerals, separated by a prefix of "1" indicating corresponding parts with the above-described embodiment. In the second embodiment, the socket assembly 120 is configured for joining a control arm (not shown) with a steering knuckle (not shown) of a vehicle suspension system. In this embodiment, the socket assembly 120 includes an upper bearing 156 in addition to a two-piece lower bearing 134, which includes the bearing and preload pieces 136, 138. This embodiment also includes a Zerk fitting 158 for injecting a lubricant (such as grease) into the open bore of the housing 122 and includes a dust boot 160 which is sealed against the housing 122 and the ball stud 128 for keeping the lubricant in and keeping contaminants out of the open bore.

Obviously, many modifications and variations of the present invention are possible in light of the above teachings. It is, therefore, to be understood that within the scope of the appended claims, the invention may be practiced otherwise than specifically described. It should also be appreciated that the terms "upper", "lower" and "bottom" are in reference to the orientations of the enabling embodiment of the invention shown in the Figures and are not meant to require any certain orientation. Additionally, it is to be understood that all features of all claims and all embodiments can be combined with each other, as long as they do not contradict each other.

What is claimed is:

1. A socket assembly, comprising:
a housing with an inner wall which surrounds an open bore that extends along a central axis;
a stud including a shank portion and a ball portion, said ball portion having an upper hemisphere and a lower hemisphere formed as a single piece, and said ball portion being received in said open bore of the housing and projecting out of said open bore through an open end in said housing;
a bearing disposed in said inner bore of said housing and interposed between said inner wall and said stud;
said bearing having a bearing piece which is in surface-to-surface contact with said stud and a preload piece which is elastically compressed to impart a biasing force on said bearing piece and to preload said bearing piece against said ball portion of said stud;
said preload piece being in overmolded engagement with said bearing piece to securely couple said preload and bearing pieces together;
said bearing piece being made of a first material that has a first modulus of elasticity and said preload piece being made of a second material that has a second modulus of elasticity which is lower than said first modulus of elasticity; and
wherein said bearing piece and said preload piece of said bearing are fused together such that a bonding area which joins said bearing and preload pieces contains both said first material and said second material mixed together.

2. The socket assembly as set forth in claim 1 wherein said bearing piece presents a plurality of protrusions that are spaced from one another to improve the overmolding engagement between said bearing piece and said preload piece of said bearing.

3. The socket assembly as set forth in claim 2 wherein said housing is deformed to compress said preload piece of said bearing.

4. The socket assembly as set forth in claim 3 wherein said preload piece is compressed between said bearing piece and a wall at a closed end of said housing.

5. The socket assembly as set forth in claim 2 wherein said bearing piece has a bearing surface which is semi-spherically curved and is in surface-to-surface contact with a semi-spherically curved outer surface of said ball portion.

6. The socket assembly as set forth in claim 1 wherein said first material is a glass-reinforced polyoxymethylene and said second material is an unreinforced polyoxymethylene.

\* \* \* \* \*